UNITED STATES PATENT OFFICE.

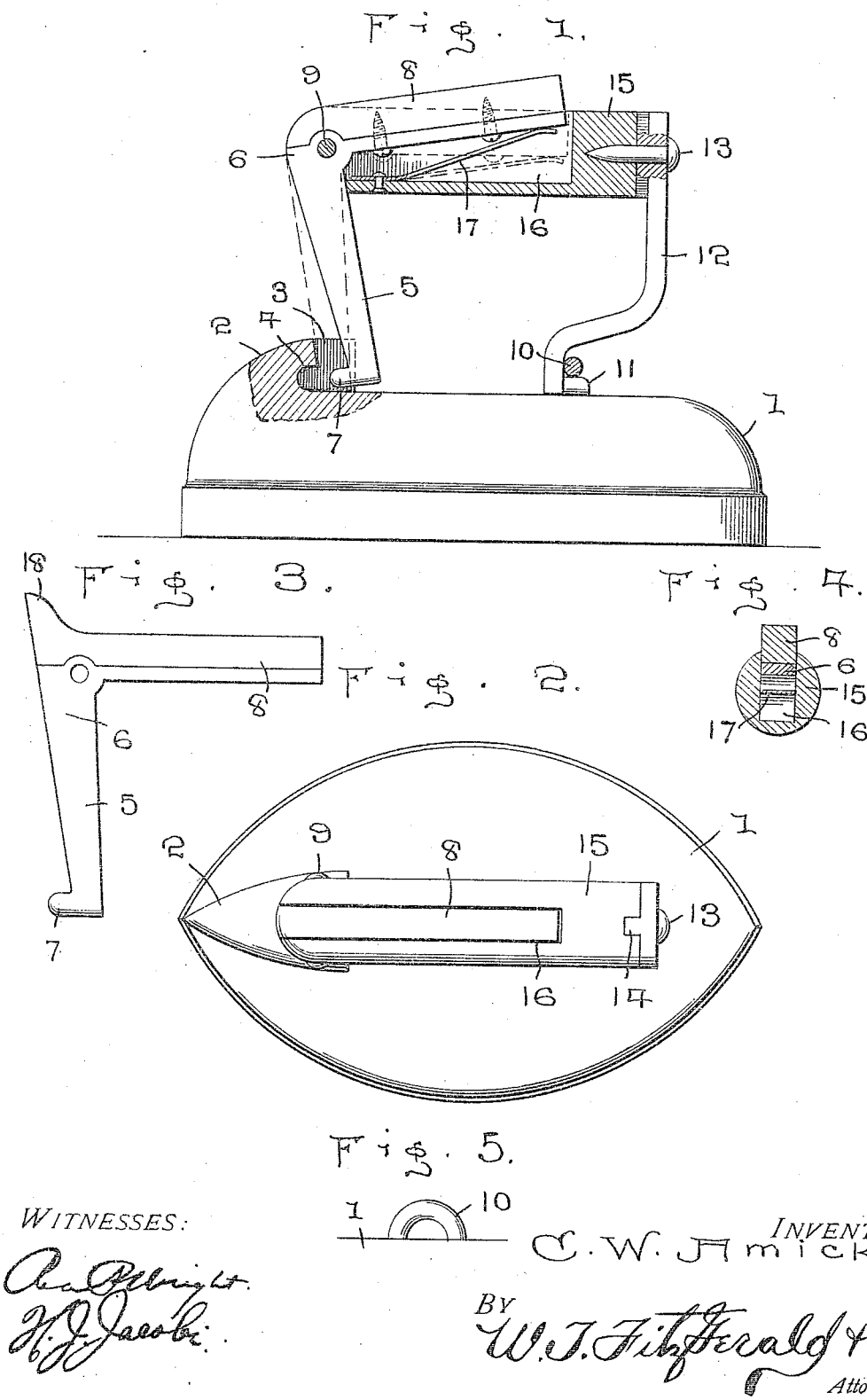

CLIFF W. AMICK, OF NEW FRANKLIN, MISSOURI.

SAD-IRON.

957,532.  Specification of Letters Patent.  Patented May 10, 1910.

Application filed July 15, 1909. Serial No. 507,853.

*To all whom it may concern:*

Be it known that I, CLIFF W. AMICK, a citizen of the United States, residing at New Franklin, in the county of Howard and State of Missouri, have invented certain new and useful Improvements in Sad-Irons; and I do hereby declare the following to be a full, clear, and exact description of the invention, such as will enable others skilled in the art to which it appertains to make and use the same.

My invention relates to new and useful improvements in sad irons and especially to the class having removable handles.

An object of my invention is to provide a device, the handle of which is easily connected to, or disconnected, from the body portion of the iron, also one having a handle which is practically automatic in its operation. These and further objects will be brought out more specifically in the following specification and claims.

Referring to the drawings which form a part of the accompanying specification, Figure 1 is a side elevation of my device partly in section. Fig. 2 is a top plan view of my device. Fig. 3 is a side view showing a modification of one member of the handle. Fig. 4 is a cross sectional view of the handle showing the plate portion of the member 6 with its overlying piece 8, and the recess in said handle member. Fig. 5 is an elevation of the keeper 10 as applied to the base.

In carrying out my invention I employ the usual or any preferred form of a base 1, said base in this instance, however, having an upstanding lug 2, said lug having a socket 4 forwardly penetrating the same, said lug also having a recess 3 extending vertically through said lug and communicating with said socket, the function of which will presently appear.

The handle of the sad iron is formed of two members, the member 6 being right-angled in outline and having pivotal connection at its angle with the member 15, at the forward end of said latter member, said connection being effected by means of a pivot 9 extending transversely through the member 6, and also through the member 15, said members 6 and 15 being provided with registering openings therethrough for the reception of said pivot, said pivot being preferably headed at both ends for the retention of the same in place.

The handle member 6 preferably comprises a horizontal plate-like rearwardly extending portion and a corresponding portion 8, the latter being secured to the former preferably by means of screws, as shown, the upper surface of said portion 8 and handle member 15 being preferably rounded for accommodation to the hand when applied thereto. Said handle portion 15 is provided with a longitudinal recess or socket 16 which receives the rearwardly extending portion and the portion 8 of the handle member 6 and interposed between said rearwardly extending portion of said handle member 6 and the bottom of said recess or socket is a preferably flat metal spring 17 for automatically elevating the rear end of the handle member 6 when pressure is removed from the handle, as clearly seen in Fig. 1, the forward end of said spring being suitably secured at the corresponding end of the handle member 15, while the rear end of said spring exerts upward pressure upon the under side of the handle member 6 near its rear end. The arm 5 of the handle member 6 has a forwardly projecting toe or stud 7 at it slower end which enters the socket 4 of the lug 2 of the sad iron, for effecting engagement therebetween when the iron is in use or pressure is applied to the handle member 6, as is indicated in dotted lines of Fig. 1. The handle member 15 has applied or connected to its rear end an arm 12, said connection being effected preferably by means of a fastening in the form of a nail inserted through said arm and entering said handle member, as clearly seen in Fig. 1, said arm having a vertical rib 14 upon its inner surface, at the upper end, engaging a corresponding recess in the rear end of said handle member to prevent accidental or casual lateral displacement of said arm. The arm 12 is preferably curved inwardly and downwardly at its lower end and is provided with a rearwardly extending stud 11 at said end adapted to engage a keeper 10 upon the upper surface of the sad iron near its rear end for the attachment of the lower end of said arm to the sad iron and whereby said arm may be readily detached or disconnected from the latter, as is apparent. It will, therefore, be noted that in applying the handle to the sad iron, the lower end of the arm 12 is initially engaged with the keeper 10 and the forward arm of the handle member 6 disposed with relation to the iron to admit its toe or projection 7, being opposed to the socket 4 of the lug 2, when by grasping the handle members 6 and 15 and exerting the usual pressure thereon as in operating the iron, the arm 5 will be moved forward and said toe caused to enter said socket and connection thus be effected between the handle and the sad iron, which connection is maintained as long as the handle is engaged by the hand. It is apparent that, as pressure is removed from the handle, the arm 5 of the handle member 6 will be automatically retracted from the socket 4 of the sad iron, when the lug 11 of the arm 12 may be readily withdrawn from the keeper 10, thus allowing the detachment of the handle from the sad iron.

It will be apparent from the herein described device that I have provided an iron with a handle so constructed as to admit of the latter being made to coöperate with the base member 1 in such a manner as will cause no appreciable trouble or labor.

If preferred, I may use a handle member similar to the one shown in Fig. 3, which has an upstanding lug 18, for the purpose of releasing the engaging arm from the retaining member, when the spring 17 is not used for a releasing means.

What I claim is:

1. A device of the character described, comprising a sad iron having near its forward end upon the upper surface a lug provided with a socket, a handle comprising two members, one of said members being right-angled in general outline and pivoted at its angle to the other handle member, the vertical arm of said right-angled handle member having means for engagement with said socket, the other handle member having a longitudinal socket therein receiving the horizontal arm of the right-angled handle member, a spring interposed between the bottom of said socket and the under side of the horizontal arm of said right-angled handle member, said spring exerting upward pressure upon the rear end of said right-angled handle member and an additional arm applied to one end of one of said handle members, and means for effecting connection between one end of said additional arm and the sad iron.

2. A device of the character described, comprising a sad iron having at its forward end upon the upper surface a lug provided with a socket and a recess communicating with said socket, said recess being arranged in the rear end of said lug, said sad iron also being provided upon its upper surface near the rear end with a keeper, and a handle comprising two members, one being of right-angled outline and pivoted at its angle to the forward end of the other handle member, the vertical arm of the right-angled handle member having a forwardly projecting toe engaging said socket, the other handle member having a longitudinal socket receiving the horizontal arm of the right-angled handle member, a spring secured at its forward end in the bottom of said longitudinal socket and having its free end engaging the under side of said horizontal arm, near its rear end, and an additional arm connected to the rear end of one of said handle members, said arm having a rearwardly projecting stud engaging said keeper.

3. A device of the character described, including a sad iron having at its forward end upon the upper surface a lug, said lug having a forwardly projecting socket and also having a vertical recess in its rear end communicating with said socket, a handle comprising two members, one being of right-angled outline and pivoted at its angle to the forward end of the other handle member, the vertical arm of said right-angled handle member having a forwardly projecting toe engaging said socket, the other handle member having a longitudinal socket receiving the horizontal arm of the right-angled handle member, a spring having its forward end secured to the bottom of said longitudinal socket and its opposite end delivering pressure upon the under side of said horizontal arm near its rear end, and an additional arm having upon its inner surface a vertical rib, one of said handle members having a corresponding recess receiving said rib, means effecting connection between said arm at its upper end and the rear end of the last referred to handle member and means effecting connection between the lower end of said additional arm and the sad iron.

In testimony whereof I have signed my name to this specification in the presence of two subscribing witnesses.

CLIFF W. AMICK.

Witnesses:
OLAND A. JONES,
LOCK L. AMICK.